(12) United States Patent
Scivicque (10) Patent No.: US 12,363,228 B2
(45) Date of Patent: Jul. 15, 2025

(54) CUSTOMER IDENTIFICATION SYSTEM AND METHOD USING SHARED TRUNK GROUP

(71) Applicant: CenturyLink Intellectual Property LLC, Broomfield, CO (US)

(72) Inventor: Joseph Scivicque, Lafayette, LA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 485 days.

(21) Appl. No.: 17/930,494

(22) Filed: Sep. 8, 2022

(65) Prior Publication Data

US 2023/0188649 A1 Jun. 15, 2023

Related U.S. Application Data

(60) Provisional application No. 63/287,560, filed on Dec. 9, 2021.

(51) Int. Cl.
| | |
|---|---|
| *H04M 3/00* | (2024.01) |
| *H04L 12/66* | (2006.01) |
| *H04M 3/58* | (2006.01) |
| *H04M 5/00* | (2006.01) |
| *H04M 7/00* | (2006.01) |

(52) U.S. Cl.
CPC ............ *H04M 3/58* (2013.01); *H04M 7/006* (2013.01)

(58) Field of Classification Search
CPC ......... H04L 67/53; H04L 63/08; H04L 67/10; H04L 41/0894; H04L 67/306; H04L 63/102; H04L 67/303; H04L 12/2829; H04Q 2213/13345; H04Q 2213/13546; H04Q 2213/345; H04Q 3/0029; H04M 3/4211; H04M 3/42059; H04M 7/006; H04M 2203/2011; H04M 2207/12; H04M 15/56; H04M 3/567; H04M 7/128; H04M 3/5235; H04M 7/125; H04M 3/4931;

(Continued)

(56) References Cited

U.S. PATENT DOCUMENTS

| | | | | |
|---|---|---|---|---|
| 2012/0106727 | A1* | 5/2012 | Kaushal | H04Q 3/0016 379/211.01 |
| 2013/0159476 | A1* | 6/2013 | Hilburn | H04L 67/306 709/220 |

(Continued)

*Primary Examiner* — Kharye Pope (57) ABSTRACT

Systems and methods are provided to provision a customer-specific identifier in cloud-based communications systems so that when a communication arrives at the network services provider, it is identified as being associated with the customer, even when the customer information would otherwise not be available. In examples, when a customer orders communication services from the network services provider (or associates the communication services with a third-party Internet telephony service), the network services provider provides the customer a unique identifier that is provisioned into that customer's instance of the third-party Internet telephony service. When the customer makes a call using the third-party Internet telephony service, the identifier is inserted into the communication (e.g., in a SIP header). The identifier is extracted when the communication is received at the network services provider and used to identify the customer so that appropriate services, service levels, etc. can be applied to the call.

18 Claims, 3 Drawing Sheets

(58) Field of Classification Search
CPC ...... H04M 7/123; H04M 15/57; H04M 15/63; H04M 2215/202; H04M 2215/7254
See application file for complete search history.

(56) References Cited

U.S. PATENT DOCUMENTS

| | | | |
|---|---|---|---|
| 2015/0288727 A1* | 10/2015 | Govindankutty | G06F 21/00 370/352 |
| 2016/0261488 A1* | 9/2016 | Moshenberg | H04L 12/4633 |
| 2017/0085596 A1 | 3/2017 | Hopson | |
| 2017/0163749 A1* | 6/2017 | Chen | H04L 51/00 |
| 2018/0316797 A1* | 11/2018 | Johnston | H04M 7/127 |
| 2019/0116268 A1* | 4/2019 | Li | H04L 65/1069 |
| 2020/0389789 A1* | 12/2020 | Singh | H04W 4/14 |

* cited by examiner

CUSTOMER IDENTIFICATION SYSTEM AND METHOD USING SHARED TRUNK GROUP

CROSS-REFERENCE TO RELATED APPLICATIONS

This application claims the benefit of U.S. Provisional Application No. 63/287,560 filed on Dec. 9, 2021, entitled "Customer Identification System and Method Using Shared Trunk Group," which is incorporated reference in its entirety.

BACKGROUND

In certain network architectures, a network services provider may not be able to accurately identify a communication as originating from a particular customer. For example, there may be no identifying information about the originating customer in the communication itself when the communication is first received at a gateway device of the provider network, such as a session border control device (SBC). In examples, the caller identification is obfuscated by a third-party calling service such that customers share calling numbers, and there is no unique calling endpoint visible in the session initiation protocol (SIP) INVITE message. As such, the network services provider then has to dedicate a trunk or trunk group to the customer and/or provide a unique IP address for the SBC to which only one customer is given access. Having one or more dedicated unique IP address and/or trunk/trunk group for each customer is inefficient. It is with respect to this general technical environment that aspects of the present systems and methods are directed.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In examples, the present application discloses a method. The method may begin by receiving, at a network services provider, a request to provision communication services for a first customer. The communication services may be provisioned, and it may be determined that the first customer desires to use a third-party Internet telephony service in conjunction with the communication services. Based on determining that the first customer desires to use the third-party Internet telephony service in conjunction with the communication services, first provider information may be provided that includes at least a trunk group identifier identifying a trunk group of the network services provider and a first origination identifier that is unique to the first customer. Thereafter, the network services provider may receive a voice-over-Internet-protocol (VoIP) call message via the trunk group from the third-party Internet telephony service, wherein the VoIP call message includes the first origination identifier. Based on the first origination identifier, it may be determined that the VoIP call message is from the first customer, and network services for the VoIP call message may be provided based on the communication services provisioned for the first customer at the network services provider.

In some examples, the method may further include providing, to a second customer, second provider information that comprises the trunk group identifier and a second origination identifier that is unique to the second customer; receiving, by the network services provider, a second VoIP call message via the trunk group from the third-party Internet telephony service, wherein the second VoIP call message includes the second origination identifier; determining, based on the second origination identifier, that the second VoIP call message is from the second customer; and providing services for the VoIP call message based on communication services provisioned for the second customer at the network services provider; wherein the first provider information and the second provider information both include a same Internet protocol address for a particular session border control device of the network services provider.

In another example, the present application discloses a system. The system comprises at least one processor; and memory, operatively connected to the at least one processor and storing instructions that, when executed by the at least one processor, cause the system to perform a method. In examples, the method comprises: receiving, at a network services provider, a request to provision communication services for a first customer; provisioning the communication services; determining that the first customer desires to use a third-party Internet telephony service in conjunction with the communication services; based on determining that the first customer desires to use the third-party Internet telephony service in conjunction with the communication services, providing first provider information that includes at least a trunk group identifier identifying a trunk group of the network services provider and a first origination identifier that is unique to the first customer; receiving, by the network services provider, a voice-over-Internet-protocol (VoIP) call message via the trunk group from the third-party Internet telephony service, wherein the VoIP call message includes the first origination identifier; determining, based on the first origination identifier, that the VoIP call message is from the first customer; and providing network services for the VoIP call message based on the communication services provisioned for the first customer at the network services provider.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

In examples, the present systems and methods provision a customer-specific identifier in cloud-based communications systems so that when a communication arrives at the network services provider, it can be identified as being associated with the customer, even when the customer information would otherwise not be available to the network services provider. For example, multiple customers may subscribe to a cloud-based, third-party Internet telephony service (e.g., a voice-over-Internet-Protocol (VoIP) service, such as a call-center application, an Internet Protocol public branch exchange (IP PBX), etc.). Each customer may be using a separate instance of the third-party Internet telephony service, but the third-party Internet telephony service may be hosted in a cloud-based system that obfuscates the details of the individual customers in messages that are transmitted to a network services provider for delivery to called parties.

In examples, when the customer orders communication services from the network services provider (or associates the communication services with a third-party Internet telephony service), the network services provider provides the customer a unique identifier that is provisioned into that customer's instance of the third-party Internet telephony service. When the customer makes a call using the third-party Internet telephony service, the identifier is inserted into the communication (e.g., in a SIP header). The identifier can then be extracted when the communication is received at the network services provider and used to identify the customer so that appropriate services, service levels, etc. can be applied to the call. Among other things, this allows the network services provider to associate the customer with the call without requiring dedication of a trunk, trunk group, or SBC IP address to the particular customer. Rather, the network services provider can employ shared trunk groups and shared SBC IP addresses for multiple customers of the third-party Internet telephony service while still accurately identifying the customer.

Figure 1:
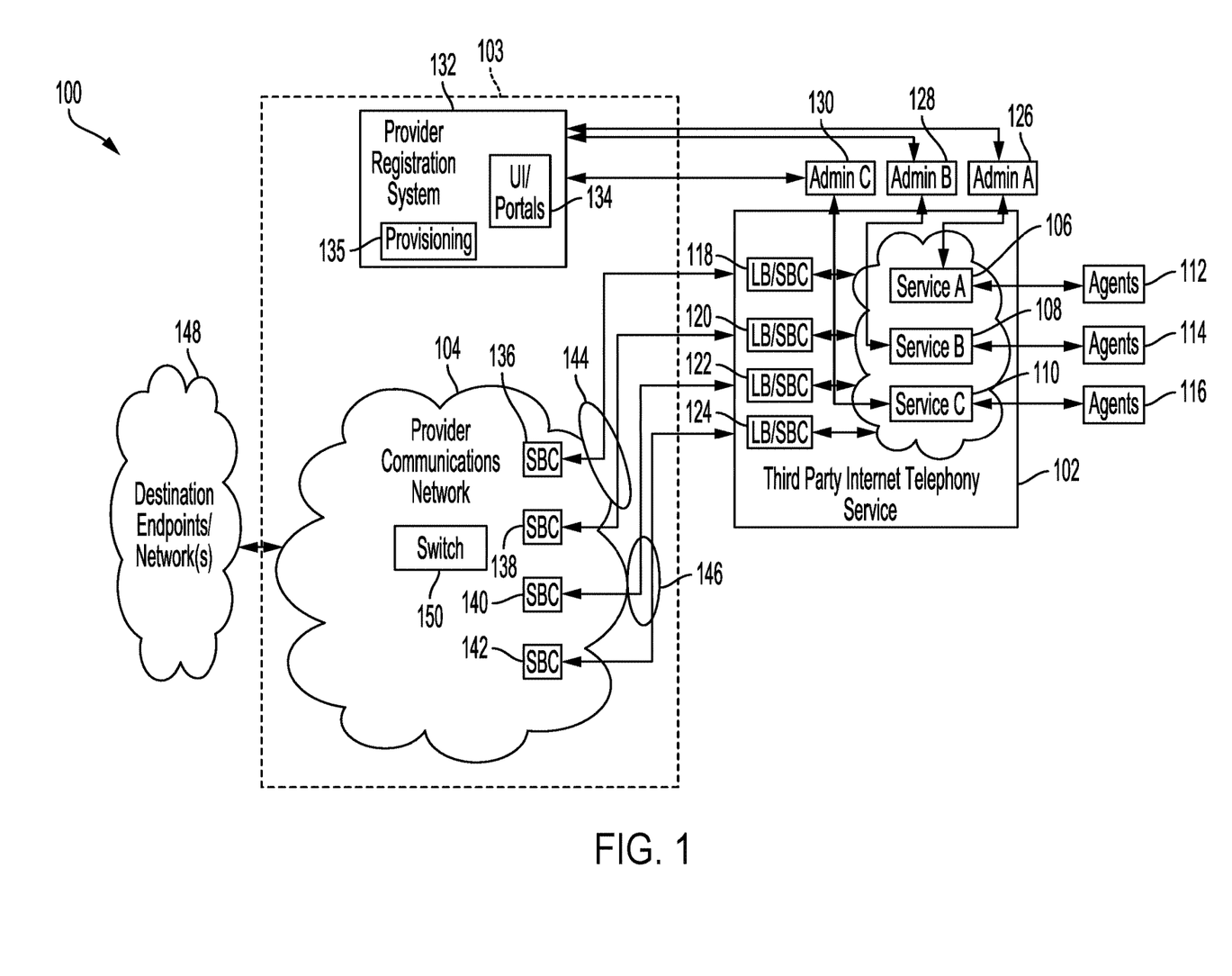
FIG. 1 is a diagram of an exemplary system for providing networking services in accordance with the present application.

FIG. 1 depicts an example system 100 for identifying customers of a third-party Internet telephony service 102 at a network services provider 103. Although only one third-party Internet telephony service 102 is shown, it is contemplated that multiple third-party Internet telephony services may be accommodated by the system 100. In examples, the third-party Internet telephony service 102 comprises a local VoIP service, a calling center application, and/or IP PBX, that can accommodate multiple customers A, B, and C, and a separate instance of the service is hosted for each customer. For example, customer A may subscribe to service instance A 106, customer B may subscribe to service instance B 108, and customer C may subscribe to service instance C 110. Agent devices 112, 114, and 116 may comprise, e.g., IP telephones, personal computers, etc., are configured to interact with service instances 106, 108, and 110, respectively, in order to send communications, such as VoIP calls. Further, in examples, the network services provider 103 is a tier-one Internet service provider, such as Lumen Technologies, Inc.

Third-party Internet telephony service 102 may be hosted in a cloud-based environment in a network that is separate from the provider communications network 104 of network services provider 103. Third-party Internet telephony service 102 may include one or more interface devices 118, 120, 122, and 124, which may comprise, for example, combination load balancer/session border control (LB/SBC) devices. In examples, administrators for customers A, B, and C may provision, access, and/or configure their respective service instances 106, 108, and 110 via administrator devices 126, 128, and 130, respectively. Administrator devices 126, 128, and 130 may also be used to order and/or configure network services from provider communications network 104 through provider registration system 132. In examples, provider registration system 132 may comprise one or more devices that are part of provider communications network 104 or separately maintained. In examples, network services provider 103 may comprise provider registration system 132 and provider communications network 104 Provider registration system 132 also includes and/or provides administrator devices 126, 128, and 130 access to one or more user interfaces/portals 134. In examples, the user interfaces/portals 134 may be used to prompt administrator devices 126, 128, and 130 for information and/or provide data to administrator devices 126, 128, and 130 or directly to service instances 106, 108, and 110, as discussed further below. In addition, provider registration system 132 may include a provisioning system 135. Provisioning system 135 may, in examples, query one or more elements of network services provider 103 to obtain information about customers, IP addresses, fully qualified domain names, and trunk group identifiers for elements of network services provider 103, etc.

Further, in examples, provider communications network 104 is operatively connected to third-party Internet telephony service 102 via SBCs 136, 138, 140, 142 and shared trunk group instances 144 and 146. Shared trunk group instances 144 and 146 may comprise session information protocol (SIP) trunk groups, wherein each trunk group provides a plurality of channels to support SIP-based VoIP. In examples, when communications (such as SIP INVITE messages) are received at one of SBCs 136, 138, 140, 142, the messages are routed through one or more switches, routers, etc. of the provider communications network 104 (such as switch 150) to the destination endpoints/networks 148, such as a local exchange carrier or other networks or devices.

In examples, customers A, B, and C may be customers of both network services provider 103 and third-party Internet telephony service 102, which are separately controlled and managed. In examples, all traffic from third-party Internet telephony service 102 appears to provider communications network 104 to come from one of the shared IP addresses used by interface devices 118, 120, 122, and 124. In addition, calling party numbers may be shared among customers A, B, and C for the third-party Internet telephony service 102. As such, provider communications network 104 may not have visibility into which of customers A, B, and C is making an Internet telephony call. Accordingly, in the past, a network services provider may have, e.g., provided each of customers A, B, and C a customer-specific IP address for a particular SBC in order for the network services provider to identify a communication as belonging to a particular one of customers A, B, or C.

In the present system, by contrast, network services provider 103 may provide a customer-specific origination identifier that can be provisioned into that customer's service instance 106, 108, or 110. For example, an administrator for customer A may use administrator device 126 to communicate with provider registration system 132. In examples, user interface 134 may present several options for ordering or configuring communication services from network services provider 103, such as tier-one Internet services, toll-telephone numbers, inbound/outbound VoIP routing services, etc. In examples, network services provider 103 may also collaborate with third-party Internet telephony service 102 to resell or coordinate services for third-party Internet telephony service 102. As such, the administrator for customer A may be able to order and/or configure one or both of communication services from network services provider 103 and VoIP services from third-party Internet telephony service 102 through the user interface/portals 134 of provider registration system 132. In examples, the administrator of customer A is prompted to enter customer information into UI/portal 134 identifying at least (a) customer A and (b) the third-party Internet telephony service 102 that customer A is subscribed to (or ordering through provider registration system 132).

In response, provider registration system 132 may return provider information. The provider information may include, among other things, telephone numbers issued by network services provider 103 for customer A, and identification of a shared trunk group instance (such as shared trunk group instance 144), and IP addresses and/or fully qualified domain names for SBCs, such as SBC 136. In examples, the provider information is retrieved, at least in part, by provisioning system 135 from network services provider 103. In addition, the provider information includes an origination identifier that is specific to customer A for third-party Internet telephony service 102. The origination identifier may be generated by provider registration system 132, by other elements of network services provider 103, or otherwise. In examples, the origination identifier is not an identifier of a trunk group (because the shared trunk group instance is shared among different customers and not specific to customer A) or the IP address (or fully qualified domain name (FQDN)) of a particular SBC (because the SBC IP addresses and FQDNs are also shared among customers A, B, and C). The provider information may be communicated back to administrator device 126. An administrator 126 may then provision the origination identifier into service instance 106 to cause service instance 106 to include the origination identifier in all calls originated by customer A (such as by agent device(s) 112). For example, the service instance 106 may include or provide access to a user interface to allow administrator device 126 to communicate the origination identifier to service instance 106.

In other examples, third-party Internet telephony service 102 may provide an interface (such as an application programming interface) to allow provider registration system 132 to programmatically interface with third-party Internet telephony service 102. For example, provider registration system 132 may provide the provider information (including the origination identifier for customer A) directly to third-party Internet telephony service 102. In examples where customer A orders, e.g., VoIP services from third-party Internet telephony service 102 through provider registration system 132, the origination identifier can be provided by registration system 132 to third-party Internet telephony service 102 as part of the provisioning process to create the service instance 106 for customer A. In other examples, the service instance 106 may be separately provisioned and instantiated (or otherwise already existing), but the provider registration system may directly communicate with third-party Internet telephony service 102 and/or the service instance 106 to cause the service instance 106 to include the origination identifier in all calls originated by customer A (such as by agent device(s) 112) that are to be transported via provider communications network 104.

In examples, the origination identifier takes the form of a header in a SIP message (such as a P-ORIGINATION-ID header). For example, when an agent device initiates a new VoIP call, a SIP INVITE message is created. For example, if agent device 112 initiates a call through service instance A 106, then service instance A 106 of third-party Internet telephony service 102 will insert the origination identifier for customer A into a header for that SIP INVITE message. For example, the origination identifier for customer A may be inserted into a P-ORIGINATION-ID header of the SIP INVITE message. Normally, P-ORIGINATION-ID headers are not shared between networks, but according the present systems and methods, an origination identifier in a P-ORIGINATION-ID header would be inserted by third-party Internet telephony service 102 and preserved when sent to provider communications network 104, where it would be used (and not ignored) by provider communications network 104 to identify the originating customer. In examples, the VoIP call message (such as the SIP INVITE) does not include information other than the origination identifier that identifies the customer to the provider communications network 104.

In nonexclusive examples, the origination identifier can be formatted according to the requirements of the origination identifier required by the STIR/SHAKEN protocols as defined, e.g., by the request for comment (RFC) documents put forth by the IETF: RFC 8224, 8225, 8226, 8588. Ordinarily the origination identifier for the STIR/SHAKEN protocol would be added by an SBC, such as SBC 136, when the message is received at the provider communications network 104. Here, the origination identifier in the SIP INVITE message received from third-party Internet telephony service 102 can be used for compliance with the STIR/SHAKEN protocols as well used for other purposes within provider communications network 104.

In other examples, the origination identifier can take the form of an alternate trunk group identifier. The alternate trunk group identifier can be inserted into the SIP message as a normal trunk group identifier ("TGRP" in the IETF RFC 4904), but the provider communications network 104 may maintain a mapping of alternate trunk group identifiers to internal trunk groups. In other words, the actual internal trunk groups can be shared among customers A, B, and C; however, each of customers A, B, and C would be provided with an alternate trunk group identifier that would be recognized by provider communications network 104 as originating from a particular one of customers A, B, or C.

One or more devices of provider communications network 104 (e.g., SBC 136 and/or other switches/routers/servers of provider communications network 104) may extract the origination identifier from the SIP INVITE header (or other portion of the message) and use it to provide various communication services and perform administrative functions. In examples, the origination ID may be used to track customer A's usage for billing purposes, may be used to enforce calling restrictions for the customer, may be used to ensure compliance with certain service level guarantees or to ensure that any customer-specific routing requirements are observed. In addition, the origination identifier from the SIP INVITE header may be stored in call detail records at the provider communications network 104, as necessary. The origination ID may also be used in conjunction with other information, such as a calling number, to provide services by the provider communications network 104. For example, the calling number may not be specific to a particular customer, but a calling number may be set up within network services provider to have restrictions for a particular customer. In one nonexclusive example, one calling number as used by a particular customer may have certain restrictions (no international calls) while another number may not. As such, the combination of the origination identifier (to identify the customer) and the calling number, may be used to enforce such restrictions on a per-customer, per-calling-number basis.

Figure 2:
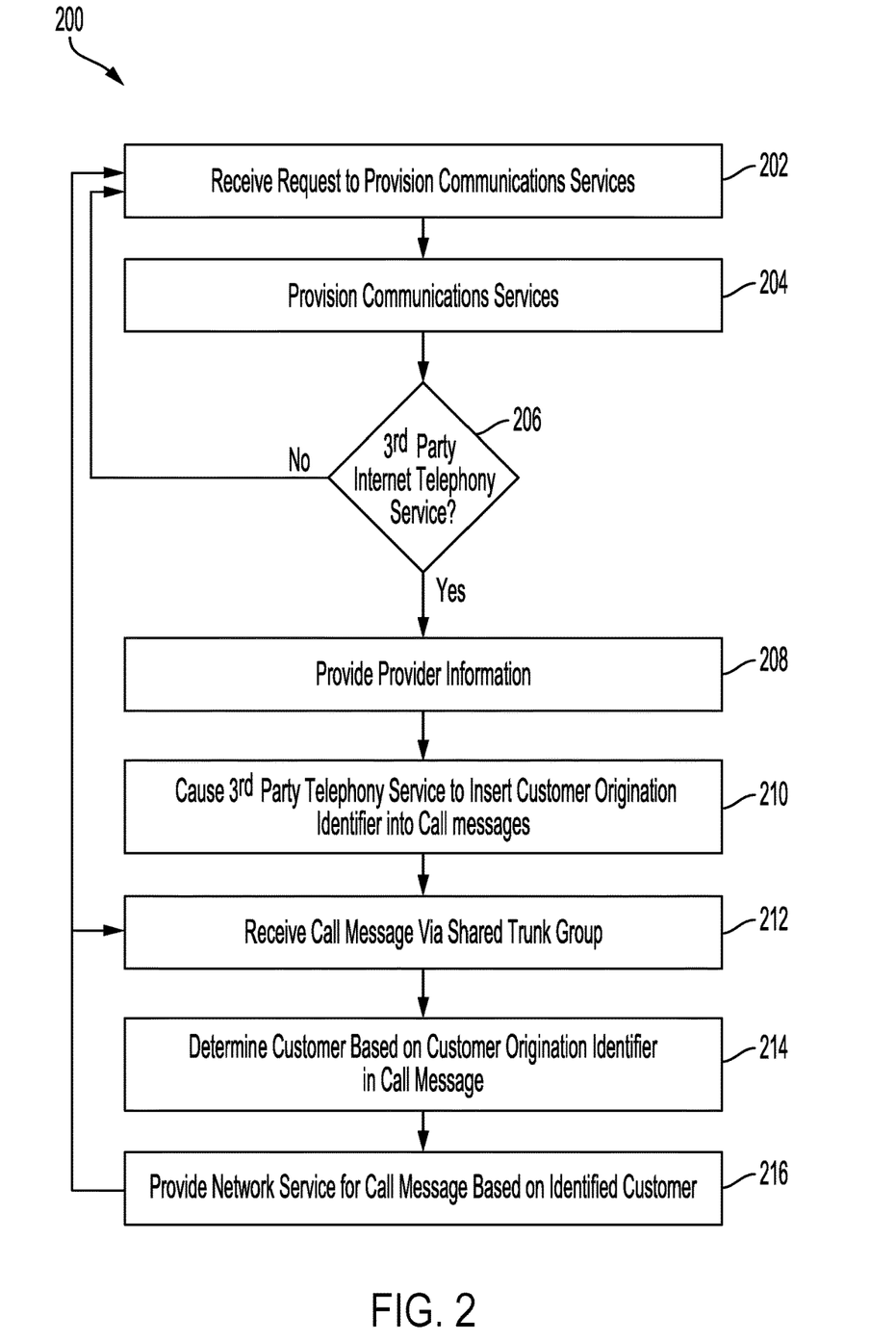
FIG. 2 depicts an example method for providing networking services in accordance with the present application.

FIG. 2 depicts an example method 200 for identifying customers of a third-party Internet telephony service at a network services provider. In examples, one or more operations of method 200 may be performed by network services provider 103 and/or provider registration system 132. At operation 202, a request to provision communication services for a first customer is received. For example, provider registration system 132 may receive a request to provision network services through user interface/portal 134 from administrator device 126 for customer A.

Flow proceeds to operation 204, where the communication services are provisioned. For example, provider registration system 132 may include a provisioning system 135. Provisioning system 135 may, in examples, query one or more elements of network services provider 103 to obtain information about customers, IP addresses, fully qualified domain names, and trunk group identifiers for elements of network services provider 103. Provisioning system 135 may also reserve bandwidth, ports, or other resources of elements of provider communications network 104 in order to provide the requested network services for a customer, such as customer A.

Flow proceeds to operation 206, where it is determined whether the customer desires to use a third-party Internet telephony service in conjunction with the communication services. If not, flow proceeds back to operation 202; however, the provider registration system 132 may determine that use of a third-party Internet telephony service is desired. For example, the provider registration system 132 may receive an indication, through user interface/portal 134 from administrator device 126, that customer A desires to use a third-party Internet telephony service in conjunction with the communication services. In examples, customer A may already be a customer of third-party Internet telephony service and desires to order the communication services from network services provider 103 to work in conjunction with the already-chosen third-party Internet telephony service. In this example, the administrator device 126 may provide an indication of which third-party Internet telephony service is being used by customer A. In other examples, the user interface/portal 134 may receive an indication from administrator device 126 that customer A desires to order both communication services from network services provider 103 and a third-party Internet telephony service. In the latter example, the user interface/portal 134 may provide options to the administrator device 126 for third-party Internet telephony services with which the network services provider may have pre-existing relationships or the ability to resell. The user interface/portal 134 may then receive a selection of the third-party Internet telephony service that the customer A desires to provision along with the communication services.

If use of a third-party Internet telephony service is determined to be desired, flow proceeds to operation 208, where, based on determining that first customer desires to use the third-party Internet telephony service in conjunction with the communication services, provider information is provided. For example, provider registration system 132 may provide the provider information to administrator device 126 that includes at least a trunk group identifier identifying a trunk group of the provider communications network 104 and a first origination identifier that is unique to the customer (in this example, customer A).

Flow proceeds to operation 210, where the third-party Internet telephony service is caused to insert the origination identifier into VoIP call messages for the customer, e.g., customer A. For example, instructions to administrator device 126 may be provided by provider registration system 132 to cause an administrator to provision the origination number received in the provider information to be added to a header of any VoIP call message prior to the VoIP call message being sent by the third-party Internet telephony service 102 to the provider communications network 104. In other examples, the third-party Internet telephony service 102 may provide an API to allow the provider registration system 132 to programmatically provide the origination number to the third-party Internet telephony service 102 to insert the origination identifier into VoIP call messages for the customer, e.g., customer A.

Flow proceeds to operation 212, where a voice-over-Internet-protocol (VoIP) call message is received by the provider communications network via the trunk group from the third-party Internet telephony service. For example, provider communications network 104 may receive the VoIP call message via shared trunk group 144 at SBC 136. In examples, the VoIP call message may be received from a calling number that is not specific to a particular customer. For example, the calling number may be shared in a third-party Internet telephony service (e.g., service 102) among a plurality of clients. In addition, the VoIP call message may be received from an LB/SBC 118 that is also not specifically dedicated to a particular customer and may be received on a shared trunk group 114 that is not dedicated to a specific customer. In examples, however, the VoIP call message includes the customer's origination identifier that was provided as part of the provider information at operation 208. For example, the VoIP call message may be a session initiation protocol (SIP) INVITE message that includes the customer's origination identifier in a header of the SIP INVITE message.

Flow proceeds to operation 214, where it is determined, based on the first origination identifier, that the VoIP call message is from the first customer. For example, continuing the example above, the SBC 136 (or a switch 150 within provider communications network 104 to which the VoIP call message is forwarded) may determine that the VoIP call message is from customer A based on the first origination identifier being included in a header of the VoIP call message from the third-party Internet telephony service 102.

Flow proceeds to operation 216, where network services for the VoIP call message are provided based on the communication services provisioned for the customer at the network services provider. For example, the VoIP call message may be forwarded through provider communications network 104 to destination endpoint(s)/network(s) 148. In examples, the VoIP call message may be communicated through provider communications network 104 with calling features, network quality guarantees, or other parameters of the communications services that were ordered by customer A via provider registration system 132.

In examples, operations 212, 214, and 216 can be repeated for subsequent VoIP messages received at the provider communications network 104 with the same (first) origination identifier. Further, some or all of operations 202-216 may be repeated for a second customer (e.g., customer B)

that registers with the provider registration system 132, receives a second provider information, including a second origination identifier, and includes the second origination identifier with one or more second VoIP messages communicated through provider communications network 104 in the manner described above. In examples, the second provider information (provider information for customer B) may comprise the same trunk group identifier and/or IP address/fully qualified domain name for a session border control device (e.g., SBC 136) as included in the first provider information, but may comprise a second origination identifier that is different from the first origination identifier and that is unique to the second customer (in this example, customer B). Further, the communications services provisioned and provided for the second VoIP call message may be different for customer B than for customer A.

Figure 3:
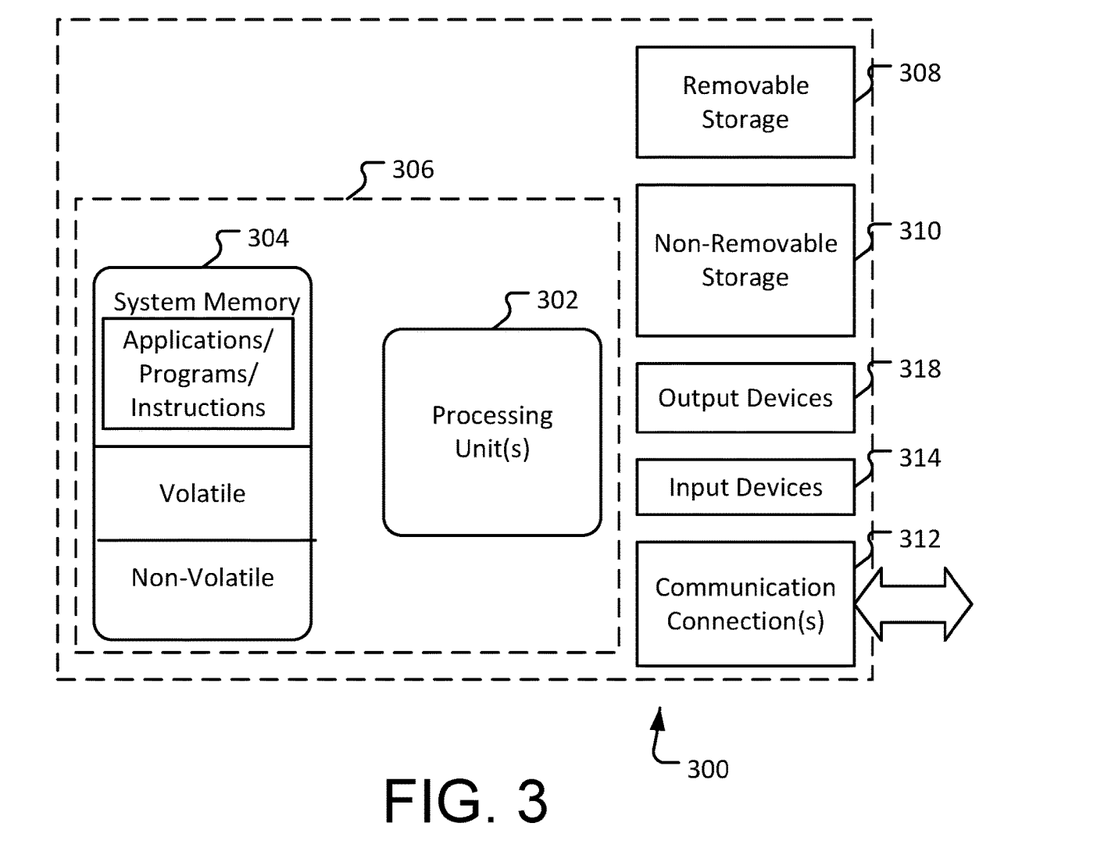
FIG. 3 illustrates an example computing environment in which one or more of the present systems and methods may be implemented.

FIG. 3 illustrates an exemplary suitable operating environment 300 for the systems and methods described herein. For example, service instances 106, 108, 110, provider registration system 132, SBCs 136, 138, 140, switch 150, LB/SBCs 118, 120, 122, 124, agents 112, 114, 116, administrator devices 126, 128, 130, and other components of system 100 may take the form of operating environment 300. In its most basic configuration, operating environment 300 typically includes at least one processing unit 302 and memory 304. Depending on the exact configuration and type of computing device, memory 304 (storing, instructions to perform the techniques disclosed herein) may be volatile (such as RAM), nonvolatile (such as ROM, flash memory, etc.), or some combination of the two. This most basic configuration is illustrated in FIG. 3 by dashed line 306. Further, environment 300 may also include storage devices (removable, 308, and/or non-removable, 310) including, but not limited to, magnetic or optical disks or tape. Similarly, environment 300 may also have input device(s) 314 such as keyboard, mouse, pen, voice input, etc. and/or output device (s) 316 such as a display, speakers, printer, etc. Also included in the environment may be one or more communication connections 312, such as LAN, WAN, point to point, etc. In embodiments, the connections may be operable to facility point-to-point communications, connection-oriented communications, connectionless communications, etc.

Operating environment 300 typically includes at least some form of computer readable media. Computer readable media can be any available media that can be accessed by processing unit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 300 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Aspects of the present invention, for example, are described above with reference to block diagrams and/or operational illustrations of methods, systems, and computer program products according to aspects of the invention. Systems depicted as blocks may be communicatively connected to one or more other systems described, whether or not such connection(s) is/are drawn as such. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method comprising:
   receiving, at a network services provider, a request to provision communication services for a first customer;
   provisioning the communication services;
   determining that the first customer desires to use a third-party Internet telephony service in conjunction with the communication services;
   based on determining that the first customer desires to use the third-party Internet telephony service in conjunction with the communication services, providing first provider information that includes at least a trunk group identifier identifying a trunk group of the network services provider and a first origination identifier that is unique to the first customer;
   receiving, by the network services provider, a voice-over-Internet-protocol (VoIP) call message via the trunk group from the third-party Internet telephony service, wherein the VoIP call message includes the first origination identifier;
   determining, based on the first origination identifier, that the VoIP call message is from the first customer; and
   providing network services for the VoIP call message based on the communication services provisioned for the first customer at the network services provider,
   wherein providing the first provider information comprises providing the provider information automatically from the network services provider to the third-party Internet telephony service.

2. The method of claim 1, wherein the VoIP call message is a session initiation protocol (SIP) INVITE message that includes the first origination identifier in a header of the SIP INVITE message.

3. The method of claim 1, further comprising:
   providing, to a second customer, second provider information that comprises the trunk group identifier and a second origination identifier that is unique to the second customer;
   receiving, by the network services provider, a second VoIP call message via the trunk group from the third-party Internet telephony service, wherein the second VoIP call message includes the second origination identifier;
   determining, based on the second origination identifier, that the second VoIP call message is from the second customer; and
   providing services for the VoIP call message based on communication services provisioned for the second customer at the network services provider.

4. The method of claim 1, further comprising:
   receiving, at the network services provider, a request to provision second communication services for a second customer;
   provisioning the second communication services;
   determining that the second customer desires to use a second third-party Internet telephony service in conjunction with the second communication services;
   based on determining that the second customer desires to use the second third-party Internet telephony service in conjunction with the second communication services, providing second provider information that includes at least a second trunk group identifier identifying a second trunk group of the network services provider and a second origination identifier that is unique to the second customer;
   receiving, by the network services provider, a second voice-over-Internet-protocol (VoIP) call message via the second trunk group from the second third-party Internet telephony service, wherein the second VoIP call message includes the second origination identifier;
   determining, based on the second origination identifier, that the second VoIP call message is from the second customer; and
   providing network services for the second VoIP call message based on the second communication services provisioned for the second customer at the network services provider.

5. The method of claim 1, wherein the VoIP call message is received from a calling number that is not specific to the first customer.

6. The method of claim 1, further comprising causing the third-party Internet telephony service to insert the first origination identifier into the VoIP call message prior to the VoIP call message being received by the network services provider on the trunk group.

7. The method of claim 3, wherein the first provider information and the second provider information both include a same Internet protocol address for a particular session border control device of the network services provider.

8. The method of claim 3, wherein the first provider information and the second provider information both include a same fully qualified domain name for a particular session border control device of the network services provider.

9. A system comprising:
   at least one processor; and
   memory, operatively connected to the at least one processor and storing instructions that, when executed by the at least one processor, cause the system to perform a method, the method comprising:
   receiving, at a network services provider, a request to provision communication services for a first customer;
   provisioning the communication services;
   determining that the first customer desires to use a third-party Internet telephony service in conjunction with the communication services;
   based on determining that the first customer desires to use the third-party Internet telephony service in conjunction with the communication services, providing first provider information that includes at least a trunk group identifier identifying a trunk group of the network services provider and a first origination identifier that is unique to the first customer;
   receiving, by the network services provider, a voice-over-Internet-protocol (VoIP) call message via the trunk group from the third-party Internet telephony service, wherein the VoIP call message includes the first origination identifier;
   determining, based on the first origination identifier, that the VoIP call message is from the first customer; and
   providing network services for the VoIP call message based on the communication services provisioned for the first customer at the network services provider,
   wherein providing the first provider information comprises providing the provider information automatically from the network services provider to the third-party Internet telephony service.

10. The system of claim 9, wherein the VoIP call message is a session initiation protocol (SIP) INVITE message that includes the first origination identifier in a header of the SIP INVITE message.

11. The system of claim 9, wherein the method further comprises:
   providing, to a second customer, second provider information that comprises the trunk group identifier and a second origination identifier that is unique to the second customer;
   receiving, by the network services provider, a second VoIP call message via the trunk group from the third-party Internet telephony service, wherein the second VoIP call message includes the second origination identifier;
   determining, based on the second origination identifier, that the second VoIP call message is from the second customer; and
   providing services for the VoIP call message based on communication services provisioned for the second customer at the network services provider.

12. The system of claim 9, wherein the method further comprises:
   receiving, at the network services provider, a request to provision second communication services for a second customer;
   provisioning the second communication services;
   determining that the second customer desires to use a second third-party Internet telephony service in conjunction with the second communication services;
   based on determining that the second customer desires to use the second third-party Internet telephony service in conjunction with the second communication services, providing second provider information that includes at least a second trunk group identifier identifying a second trunk group of the network services provider and a second origination identifier that is unique to the second customer;
   receiving, by the network services provider, a second voice-over-Internet-protocol (VoIP) call message via the second trunk group from the second third-party Internet telephony service, wherein the second VoIP call message includes the second origination identifier;
   determining, based on the second origination identifier, that the second VoIP call message is from the second customer; and
   providing network services for the second VoIP call message based on the second communication services provisioned for the second customer at the network services provider.

13. The system of claim 9, wherein the VoIP call message is received from a calling number that is not specific to the first customer.

14. The system of claim 9, wherein the method further comprises causing the third-party Internet telephony service to insert the first origination identifier into the VoIP call message prior to the VoIP call message being received by the network services provider on the trunk group.

15. The system of claim 11, wherein the first provider information and the second provider information both include a same Internet protocol address for a particular session border control device of the network services provider.

16. The system of claim 11, wherein the first provider information and the second provider information both include a same fully qualified domain name for a particular session border control device of the network services provider.

17. A method comprising:
   receiving, at a network services provider, a request to provision communication services for a first customer;
   provisioning the communication services;
   determining that the first customer desires to use a third-party Internet telephony service in conjunction with the communication services;
   based on determining that the first customer desires to use the third-party Internet telephony service in conjunction with the communication services, providing first provider information that includes at least a trunk group identifier identifying a trunk group of the network services provider and a first origination identifier that is unique to the first customer;
   receiving, by the network services provider, a voice-over-Internet-protocol (VoIP) call message via the trunk group from the third-party Internet telephony service, wherein the VoIP call message includes the first origination identifier;
   determining, based on the first origination identifier, that the VoIP call message is from the first customer;
   providing network services for the VoIP call message based on the communication services provisioned for the first customer at the network services provider;
   providing, to a second customer, second provider information that comprises the trunk group identifier and a second origination identifier that is unique to the second customer;
   receiving, by the network services provider, a second VoIP call message via the trunk group from the third-party Internet telephony service, wherein the second VoIP call message includes the second origination identifier;
   determining, based on the second origination identifier, that the second VoIP call message is from the second customer; and
   providing services for the VoIP call message based on communication services provisioned for the second customer at the network services provider;
   wherein the first provider information and the second provider information both include a same Internet protocol address for a particular session border control device of the network services provider, and
   wherein providing the first provider information comprises providing the provider information automatically from the network services provider to the third-party Internet telephony service.

18. The method of claim 17, further comprising causing the third-party Internet telephony service to insert the first origination identifier into the VoIP call message prior to the VoIP call message being received by the network services provider on the trunk group.

* * * * *